United States Patent Office 3,840,493
Patented Oct. 8, 1974

3,840,493
MOLDING COMPOSITIONS BASED ON A RADIAL HOMOPOLYMER OF A CONJUGATED DIENE
Oren L. Marrs and Richard C. Doss, Bartlesville, Okla., assignors to Phillips Petroleum Company
No Drawing. Filed Mar. 29, 1972, Ser. No. 239,312
Int. Cl. C08f 45/04
U.S. Cl. 260—41.5 A                  7 Claims

ABSTRACT OF THE DISCLOSURE

A molding composition comprising branched high vinyl polymers of conjugated dienes and a method for preparing same comprised of compounding the branched high vinyl polymers with fillers.

---

This invention relates to molding compositions. In another aspect, this invention relates to a method of compounding branched high vinyl polymers with fillers. In yet another aspect, this invention relates to a method of curing the compounding molding compositions.

The need for improved molding compositions has not been completely satisfied even by the variety of polymeric materials known at this time. An improved molding composition and a method of curing the composition to provide cured resins having improved molding characteristics, mechanical strength, and stiffness is herein provided.

High vinyl, linear polybutadienes, for example, can be cured to produce extremely rigid products. Such compositions, however, tend to exhibit considerable cure shrinkage and internal stress cracking in thick cross sections which seriously limits practical usage of structural materials. Incorporating various fillers and coupling agents decreases mold shrinkage and results in products having better crack resistance. Alterations of properties of cured compositions derived from high vinyl, linear polybutadienes are effected by the use of various fillers. These improved products satisfy a certain part of the market; however, expanding market demands in the area of electrical devices, automotive parts, and bases for printed circuitry, present a need for superior mechanical properties such as flexural strength and flexural modulus.

It is an object of this invention to provide an improved molding composition having improved physical properties. It is another object of this invention to provide a method for compounding branched high vinyl polymers with fillers. Yet another object of this invention is to provide a method for curing the compounded molding compositions.

In accordance with the present invention, branched polymers of conjugated dienes having from 4 to 12 carbon atoms per molecule, a vinyl unsaturation content of from about 50 to about 85 percent, and a majority of branched polymers are compounded with fillers and coupling agents. These compounded compositions can be cured in the presence of, for example, a peroxide thereby resulting in composites which exhibit superior mechanical properties such as flexural strength and flexural modulus at elevated temperatures. For example, at temperatures of about 250° C. these branched high vinyl composites exhibit mechanical properties superior to composites derived from linear polybutadienes having a similar vinyl content. The preferred molding compositions include cured composites based on branched high vinyl homopolymers of 1,3-dienes having a majority of branched polymers and from 50 to 85 percent vinyl unsaturation through 1,2-addition.

Branched high vinyl polymers can be prepared by polymerizing conjugated dienes having from 4 to 12 carbon atoms per molecule with an alkali metal initiator in the presence of a vinyl promoter followed by termination with a polyfunctional coupling agent. For example, an organo-mono-lithium initiator can be utilized to produce polymers which contain an active lithium atom on one end of the polymer chain. This lithium-terminated polymer is then reacted with a compound which has at least one, preferably three, reactive sites capable of reacting with a carbon-lithium bond and adding to the carbon possessing this bond in the polymer. The result is a polymer having high vinyl unsaturation content and relatively long branches which radiate from a nucleus formed by the polyfunctional compound which react with the lithium-terminated polymer. Conveniently, these branched polymers can be referred to as radial polymers having high vinyl unsaturation content.

These radial polymers can range from viscous liquids of relatively low molecular weight to tough solid rubbery compositions of relatively high molecular weight. The type of polymer produced will generally be determined by the particular end use planned for the polymer and can be most easily controlled by the amount of polymerization initiator employed. If other conditions are held constant, the more initiator employed, the lower the molecular weight of the resulting polymer.

Branched or radial high vinyl polybutadiene, for example, can be prepared by first forming a high vinyl base polymer of butadiene having one or two terminally reactive alkali metal atoms per base polymer molecule. The terminally reactive high vinyl base polymer is then reacted with a joining agent capable of joining, on the average, more than two base polymer molecules resulting in a radial polymer having, preferably, a majority of branched polymer chains.

Molding compositions according to the present invention can be cured, resulting in a solid, infusible, insoluble state. The molding compositions usually contain one or more fillers and are normally supplied to the industry as premixes in a granular form ranging from fine powder to coarse particles. Other premix forms include fluffy, rag-filled types, and paste. Suitable peroxides used in the invention for curing purposes may be selected, for example, from hydroperoxides, dialkyl peroxides, peroxy esters, peroxy carbonates, and peroxy ketals. The amount of curing agent can vary up to about 5 percent by weight based upon the weight of the polymer used. The molding compositions are compounded and cured in the presence of fillers such as calcium carbonate, asbestos, calcium silicate, quartz, silica, and glass strands and the like, constituting a filler level of up to about 80 percent by weight of the total weight composition.

The molding compositions compounded and cured in the presence of fillers can be further enhanced by coupling agents which comprise up to about 1 percent by weight based upon the weight of the polymer. A coupling agent can be defined as that material which enhances adhesion by joining a binder or polymer to a substrate surface such as glass fibers or other fillers. A preferred coupling agent according to the invention is a vinyl silane, for example, tris(methoxyethoxy)vinyl silane. Composites compounded and cured in the presence of suitable coupling agents retain their original flexural properties much longer than those composites compounded and cured in the absence of said coupling agents.

The molding compositions according to the invention can be cured at elevated temperatures, for example, from about 150 to about 200° C. for a period of about 5 minutes to one hour. Suitable temperature-time cycles for the present process are: 5 minutes at 150° C., 10 minutes at 150 to 170° C., and 15 minutes at 170° C.

Molding compositions derived from, for example, radial polybutadienes exhibit good flow properties and cured compositions possess good mechanical properties such as flexural strength and flexural modulus. The potential of radial polybutadiene molding compositions is illustrated by the properties of same which are cured with free radical initiators in the presence of fillers. The following data as illustrated in the table demonstrate the superior elevated temperature properties of the cured compositions derived from high vinyl radial or branched polybutadienes over similar compositions based upon a high vinyl linear polybutadiene. The cured compositions based on the radial polymers of butadiene having from about 50 to about 85 percent vinyl unsaturation were compared to cured compositions derived from linear polybutadiene containing from 65 to 85 percent vinyl unsaturation.

coupling agent is vinyl silane comprising up to about 1 weight percent of the polymer.

4. A molding composition according to claim 1 wherein the composition is comprised of up to 5 weight percent based on the polymer weight, of a peroxide curing agent selected from the group consisting of hydroperoxides, dialkyl peroxides, peroxy esters, peroxy carbonates, and peroxy ketals.

5. A molding composition according to claim 1 comprising a radical homopolymer of butadiene, 50–80 percent by weight of a filler selected from the group consisting of calcium carbonate, calcium silicate, quartz, asbestos, glass strands, and silica, up to one weight percent

TABLE

| Rubber | Percent vinyl | Molecular weight | Percent by weight of composite filler | Flexural strength, p.s.i. $\times 10^{-3}$ at— 25° | Flexural strength, p.s.i. $\times 10^{-3}$ at— −250° C. | Flexural modulus, p.s.i. $\times 10^{-5}$ at— 25° | Flexural modulus, p.s.i. $\times 10^{-5}$ at— −250° C. |
|---|---|---|---|---|---|---|---|
| 1. Radial (branched) polybutadiene | 65 | 20,000 | 70 | 12.9 | 11.4 | 10.8 | 8.6 |
| 2. do | 70 | 100,000 | 70 | 8.4 | 6.3 | 8.9 | 6.5 |
| 3. Linear polybutadiene | 72 | 299,000 | 70 | 8.1 | | 3.8 | |

The first two compositions included in the above Table are in accordance with the invention and can be directly compared to the high vinyl, linear polybutadiene control illustrated by the third composition. The tabulated data demonstrate the superior properties at elevated temperature of the cured inventive composites derived from the radial polymers of butadiene as compared to that from the linear high vinyl polybutadiene.

The nature of the present invention having been fully set forth and illustrated will obviously present variations and modifications to those skilled in the art and those variations and modifications are considered as being included in the present invention without departing from the spirit or scope thereof.

We claim:

1. A molding composition comprising: at least one radial homopolymer of a conjugated diene having from 4 to 12 carbon atoms per molecule, and having a vinyl unsaturation content of from 50 to about 85 percent;
   at least 50 percent by weight based on the total composition of a filler selected from the group consisting of calcium carbonate, calcium silicate, quartz, asbestos, glass strands, and silica,
   a coupling agent, and
   a peroxide curing agent.

2. A molding composition according to claim 1 wherein the composition is comprised of up to about 80 percent by weight filler.

3. A molding composition according to claim 1 wherein the polymers are homopolymers of butadiene having the vinyl unsaturation comprised of 1,2-addition and the of a vinyl silane coupling agent, and up to five weight percent of a peroxide curing agent selected from the group consisting of hydroperoxides, dialkyl peroxides, peroxy esters, peroxy carbonates, and peroxy ketals.

6. The heat cured, solid, infusible, insoluble product of claim 4.

7. The heat cured, solid, infusible, insoluble product of claim 5.

References Cited

UNITED STATES PATENTS

| 2,894,926 | 7/1959  | Jacobson            | 260—28.5   |
| 3,083,175 | 4/1963  | Safford             | 260—45.5   |
| 3,325,429 | 6/1967  | Harris              | 260—23.7   |
| 3,443,620 | 5/1969  | Vanderbilt          | 260—41.5 AX |
| 3,586,661 | 7/1971  | Parris              | 260—85.3   |
| 2,867,603 | 1/1959  | Safford             | 260—45.5   |
| 3,635,934 | 1/1972  | Schaffhauser et al. | 260—94.7 A |
| 3,595,851 | 7/1971  | Boutsicaris et al.  | 260—41.5 R |
| 3,533,830 | 10/1970 | Marzocchi et al.    | 260—41.5 R |
| 3,281,383 | 10/1966 | Zelinsky et al.     | 260—880 B  |

OTHER REFERENCES

Van der Horn,, "Reaction Between Peroxide and Polydiolefins," pp. 273–278 (1963).

MORRIS LIEBMAN, Primary Examiner

R. ZAITLEN, Assistant Examiner

U.S. Cl. X.R.

260—42.37, 880 B